United States Patent
Kancler et al.

(10) Patent No.: US 8,022,991 B1
(45) Date of Patent: Sep. 20, 2011

(54) MASSIVELY-PARALLEL THREE-AXIS STABILIZATION OF FOCAL PLANE DATA

(75) Inventors: Henry C. Kancler, Los Altos Hills, CA (US); Tsi-Pin Choong, Los Altos Hills, CA (US); Barry A. Wealand, San Jose, CA (US); Leon K. Wood, Sunnyvale, CA (US); Katarina Van Heusen, Menlo Park, CA (US); John T. Reagan, Santa Clara, CA (US); Theodore J. Mills, Cupertino, CA (US); Michael A. Levin, Half Moon Bay, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 234 days.

(21) Appl. No.: 12/369,689

(22) Filed: Feb. 11, 2009

Related U.S. Application Data

(62) Division of application No. 11/094,218, filed on Mar. 31, 2005, now Pat. No. 7,511,738.

(51) Int. Cl.
*H04N 17/00* (2006.01)
*H04N 5/232* (2006.01)
*G06K 9/00* (2006.01)

(52) U.S. Cl. .................. 348/193; 348/352; 382/103
(58) Field of Classification Search .................. 348/193, 348/352, 208.1–208.13; 382/103, 291
See application file for complete search history.

(56) References Cited

U.S. PATENT DOCUMENTS

| 5,107,293 | A | | 4/1992 | Sekine et al. | |
| 5,253,308 | A | | 10/1993 | Johnson | |
| 5,798,786 | A | * | 8/1998 | Lareau et al. | 348/144 |
| 5,970,173 | A | | 10/1999 | Lee et al. | |
| 6,047,366 | A | | 4/2000 | Ohara et al. | |
| 6,747,686 | B1 | * | 6/2004 | Bennett | 348/145 |
| 6,831,688 | B2 | | 12/2004 | Lareau et al. | |
| 2002/0063807 | A1 | * | 5/2002 | Margulis | 348/745 |

* cited by examiner

*Primary Examiner* — Trung Diep
(74) *Attorney, Agent, or Firm* — McDermott Will & Emery LLP

(57) ABSTRACT

A system and method for three-axis stabilization of focal plane data. The system and method include performing a two-dimensional vertical shear transformation and a two-dimensional horizontal shear transformation. The system and method further incorporate a SIMD computer architecture and an array of addressable processing elements that process the field-of-view for a target image received by a focal plane array of detector elements. Each processing element includes a calculation device that calculates the row and column address of virtual pixels for a virtual field-of-view. The system and method further include a plurality of memory modules configured to store data in a plurality of addressable storage locations by column and row, and each memory module is identified with a different processing element. A dedicated memory routing network for the processing elements and memory modules permits the exchange of information between processing elements and memory modules associated with each processing element.

3 Claims, 13 Drawing Sheets

GIMBAL MOUNTED CAMERA
LINE OF SIGHT IS COALIGNED
WITH REFERENCE (EXCEPT FOR JITTER)

THE PLANE OF Y AND Z IS
THE VIRTUAL FIELD OF VIEW
AND FEATURES ARE MEASURED
IN ANGLES (RADIANS)

MASSIVELY-PARALLEL THREE-AXIS STABILIZATION OF FOCAL PLANE DATA

CROSS REFERENCE TO RELATED APPLICATIONS

This application is a divisional of U.S. patent application Ser. No. 11/094,218 entitled "Massively-Parallel Three-Axis Stabilization Of Focal Plane Data," filed on Mar. 31, 2005, which is hereby incorporated by reference in its entirety for all purposes.

BACKGROUND

1. Field

The present disclosure relates generally to image processing and, more particularly, to stabilization of focal plane data.

2. Related Art

Focal plane arrays are used in a number of image processing applications. For example, missile interceptor guidance techniques may include acquiring and processing digital video data from the focal planes of cameras mounted on the interceptor. The camera optics may provide a way to focus light from distant sources onto the focal planes, which may be two-dimensional staring arrays of many thousands of detector elements. These detector elements may capture light in various wave bands to provide a signal for detecting and tracking targets.

Targets appear as small groups of pixels against a uniform background. At intercept, the target may quickly grow to fill the entire viewable two-dimensional field-of-view (FOV).

It may be desirable to minimize weight, space, and power for focal plane arrays and related components by providing as compact a design as feasible. Simultaneously, it may also be desirable to reduce the unwanted noise so as not to compromise the signal. One such source of noise may be jitter due to unsteadiness of the camera. Other sources of noise may be uncertainties in focal plane characteristics, or read-out and quantization noise.

Reliability of a missile interceptor system may be affected by the signal-to-noise ratio. In particular, increasing the signal-to-noise ratio may be desired to improve the range at which targets can be reliably tracked.

Referring now to FIG. 1, illustrated is an exemplary camera 110 having a target image 120 on a focal plane array of detector elements 130. Inertial measurement unit 140 measures angular data which can be received by the focal plane array 130. At any particular moment, a reference boresight position on the focal plane (i.e. the camera's [0, 0] coordinates), extended as a ray from the camera 110 constitutes the line-of-sight of the camera 110 and may be available from an inertial measurement unit (IMU).

As indicated, stabilization is important in reducing the noise. Some have attempted to address stabilization issues using mechanical gimbal assemblies. Referring now to FIG. 2, illustrated is a camera 200 mounted to a missile interceptor 230 via a gimbal assembly 210.

This gimbal assembly 210 is a mechanical stabilization solution used to stabilize the camera body 200 and focal plane. The gimbal assembly 210 is designed to physically rotate the camera 200 so that the camera remains stable in a reference coordinate system. As an alternative to the gimbal assembly, mirror assemblies may be used to steer light sources into the camera to achieve a similar effect.

Mechanical gimbal assemblies, such as the one shown, may suffer from shortcomings in that they may be heavy and bulky. Moreover, the electronics used in these systems may include closed-loop feedback reaction to the sensed motions of an in-flight missile interceptor. Such electronics may reduce coupling of the interceptor motion and the camera body into a considerably smaller level of jitter in the optical signal.

Nonuniformity in focal plane detectors may also be a source of noise. Therefore, while focal plane detectors may be highly sensitive to incoming light, nonuniformity between detectors may counterbalance detector sensitivity. While calibration may be helpful in reducing the effects of this nonuniformity, a noise component may still exist. This noise component may corrupt the signal as it moves across the detector array.

Some have attempted to address the issue of detector-to-detector nonuniformity using differential techniques or calculations. Referring now to FIG. 3, illustrated is a graphical comparison 300 of a differential technique 310 and a constant technique 320. Results from the differential technique 310 are shown at the upper portion of the screen. Results from the constant technique are shown at the lower portion of the screen. As illustrated, noise may be attributed to the nonuniformity of the detectors.

Differential detection as represented by 310 occurs when an individual detector subtracts previous samples on that detector from current samples. The non-uniformity may then become irrelevant because the measurements are taken against the same detector. The inherent sensitivity of the detector, subject to its read-out noise, may be realized.

The device on which a camera having a focal plane array is mounted may also produce jitter through its motion. For example, in the case of a missile interceptor, jitter may be caused by a missile interceptor's body motion. This jitter may need to be reduced in order to improve camera optics. This jitter may be reduced using a coordinate transformation on incoming data.

Referring now to FIG. 4, illustrated is a graphical representation of a coordinate system on which a coordinate transformation may be performed. As illustrated, the plane of y and z may be the virtual field-of-view (i.e., the original field-of-view having coordinate transformations).

The camera angles relative to a reference frame in pitch, yaw, and roll, as measured by integration of gyro delta-angle measurements in each axis, may be applied in a succession of operations to re-register the camera data to a virtual field-of-view or VFOV. The virtual field-of-view may merely be a set of numbers which only exists in computation.

The real video data may be captured in frames. Frames may be an entire sample set from the focal plane, and they may be continuously collected from the camera. Frames may be first translated in pitch and yaw, and then rotated in roll to compensate for the instantaneous line of sight difference relative to the reference coordinate system. These measurements are available from the missile's navigation system as either quaternions or direction cosines. For a forward-looking camera, these angles may be the same as missile body angles. The equations for a general transformation of this sort are well known.

Virtual output pixels may be arithmetically calculated based on the proportional intensities of the overlapping real pixels which cover it. Referring now to FIG. 5, illustrated is a virtual focal plane 500 illustrating the mapping of real pixels 510 to virtual pixels 520. Computationally, this may be a complicated irregular calculation. Moreover, this computation combines data from multiple, imperfectly compensated real pixels. The resultant virtual pixel will necessarily incorporate more noise. Further, any direct implementation of computations such as those described may be impractically large using conventional computing techniques. Detector arrays can have in the range of one million pixels and the sampling rates required for reproducing missile motion can be in the hundreds of hertz, making this a formidable computing challenge.

There is a need for a stabilization system that reduces mechanical complexity so that the mechanisms used to stabilize the focal plane data are not so heavy and bulky.

There is further a need for a stabilization system that reduces electronic complexity so that the electronics do not become a significant source of noise that counterbalance the detector sensitivity.

There is still further a need for a stabilization system that performs coordinate transformation without the complexities and irregularities present in some prior art techniques.

SUMMARY

The present disclosure addresses the needs noted above and provides for massively parallel three-axis stabilization of focal plane data. In accordance with one embodiment of the present disclosure, an efficient mechanism for three-axis stabilization of two-dimensional images is disclosed that uses massive parallelism supplemented with data routing hardware. The mechanism comprises an array of addressable processing elements configured to process the field-of-view for a target image received by a focal plane array of detector elements, the processing elements being further configured to receive instructions, wherein each processing element includes a calculation device configured to calculate the row and column address of virtual pixels for a virtual field-of-view. The mechanism further comprises a plurality of memory modules configured to store data in a plurality of addressable storage locations, wherein the storage locations are addressable by column and row, each memory module of said plurality of memory modules identified with a different processing element. The mechanism still further comprises a dedicated memory routing network for the processing elements and memory modules, the network being configured to exchange information between processing elements, the routing network being further configured to exchange information between memory modules associated with each processing element.

The mechanism further comprises a translation device configured to translate the entire field-of-view to the center position of the virtual field-of-view in accordance with camera pitch and yaw offsets, wherein the translation is limited to the nearest pixel; and a rotation device configured to approximate a rotation around the center position of the virtual field-of-view, the rotation device being further configured to perform a first shear transformation and a second shear transformation based on the first shear transformation, one of the shear transformations being a horizontal shear transformation and the other being a vertical shear transformation.

In accordance with another embodiment of the present disclosure, a system is provided for partitioning processing complexity to minimize the overall throughput and logic required. The system comprises a focal plane array of detector elements. The system further comprises a distributed memory array that is distributed across a plurality of semiconductor chips, the distributed memory array representing two-dimensional arrays for the focal plane array, at least one of the arrays representing a virtual field-of-view. The system further comprises a plurality of processing elements configured to read original pixel data from the focal plane array of detector elements, and to calculate virtual addresses for virtual pixels in the virtual field-of-view.

In accordance with yet another embodiment of the present disclosure, a method is provided for maximizing the signal-to-noise ratio for detecting targets with non-uniform detector arrays. The method comprises performing a two-dimensional vertical shear transformation, including by modifying row addresses of original pixels in order to reposition the original pixels based on a column number and roll angle for each pixel, thereby creating a vertical sheared array; and performing a two-dimensional horizontal shear transformation on the vertically sheared array, including by modifying only the column addresses of the vertically sheared pixels to reposition the pixels based on the roll angle and the row number, thereby creating a horizontally sheared array. Alternatively, the horizontal shear transformation may be performed first. The vertical shear transformation may then be performed on the horizontally sheared array.

It is understood that other embodiments of the present disclosure will become readily apparent to those skilled in the art from the following detailed description, wherein it is shown and described only exemplary embodiments of the disclosure by way of illustration. As will be realized, the principles described in this disclosure may be incorporated into other and different embodiments and its several details are capable of modification in various other respects, all without departing from the spirit and scope of the present disclosure. Accordingly, the drawings and detailed description are to be regarded as illustrative in nature and not as restrictive.

BRIEF DESCRIPTION OF DRAWINGS

Aspects of the present disclosure are illustrated by way of example, and not by way of limitation, in the accompanying drawings wherein.

DETAILED DESCRIPTION OF THE PRESENT DISCLOSURE

The present disclosure provides for massively parallel three-axis stabilization of focal plane data from focal plane detector arrays. The present disclosure provides a means of electronically stabilizing focal plane data and then reconstructing any targets in the scene. In accordance with the present disclosure, a massively parallel array of processing elements is designed to quickly locate targets in an interceptor's field-of-view. The target location may be followed by a more refined process of calculation to combine the collected data into an image without compromising the inherent signal-to-noise ratio of individual detector elements.

The computer architecture used in the present disclosure is a Single Instruction Multi-Data (SIMD) architecture. This architecture provides an efficient implementation of identical operations for arrays of large numbers, such as those acquired from focal planes.

Figure 1:
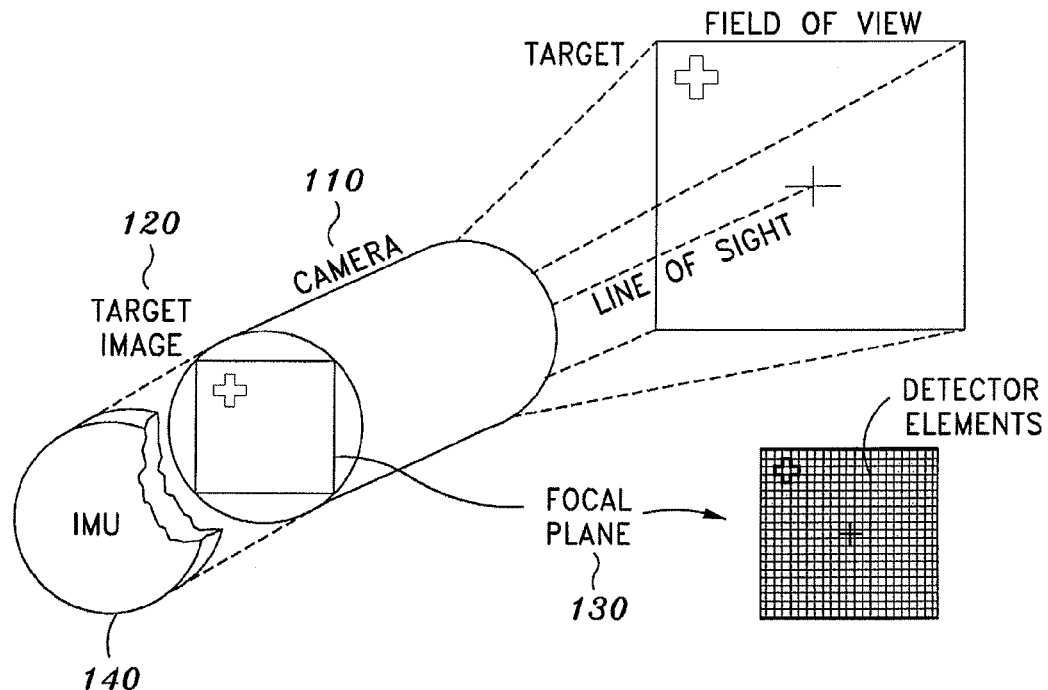
FIG. 1 illustrates a missile interceptor and target image on focal plane data.
Figure 2:
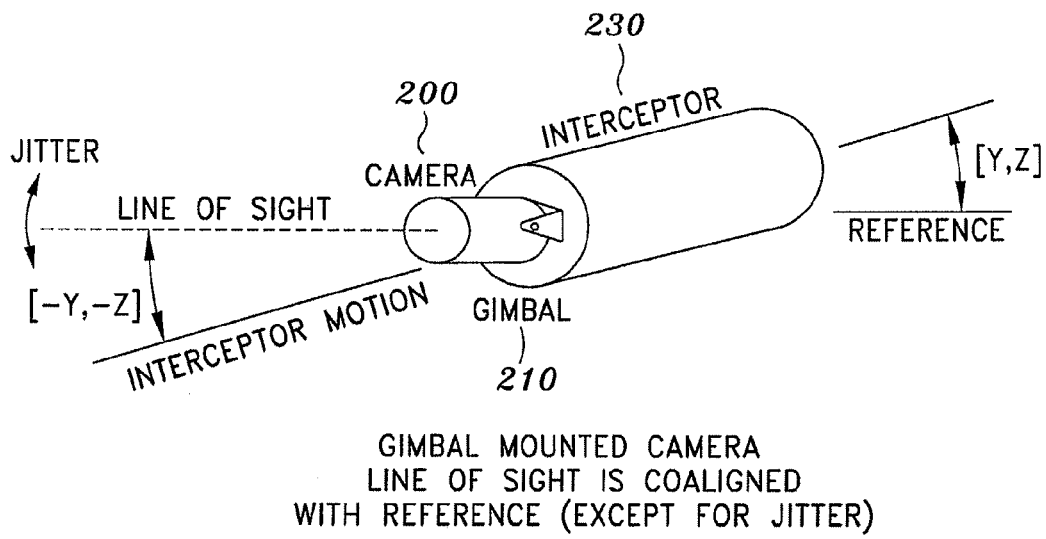
FIG. 2 illustrates a prior art gimbaled camera mechanism using mechanical stabilization techniques.
Figure 3:
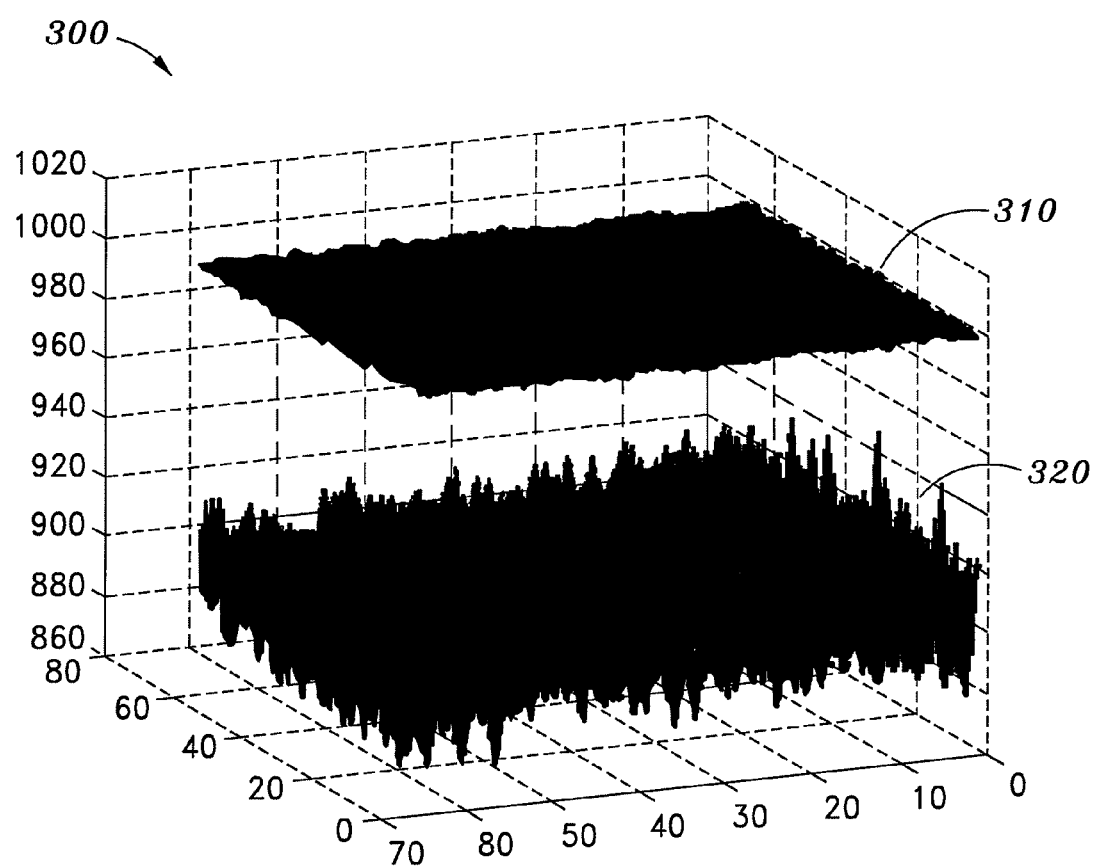
FIG. 3 illustrates a graphical comparison of a differential technique and a constant technique.
Figure 4:
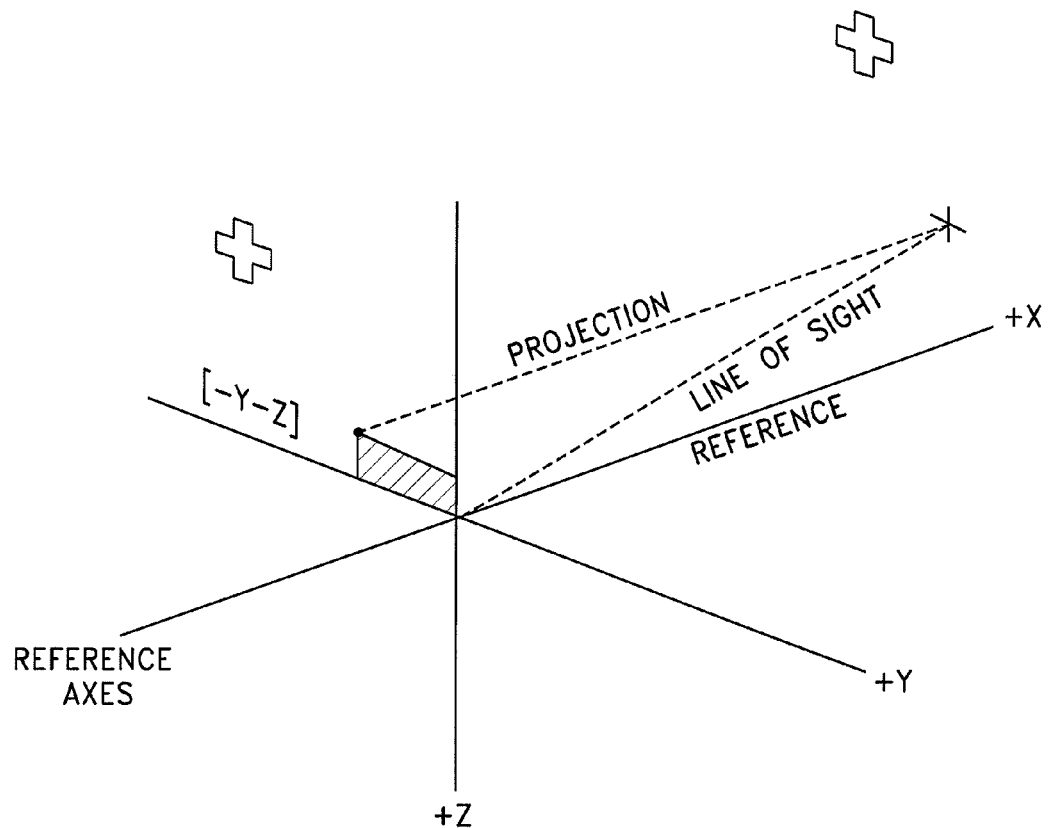
FIG. 4 illustrates a graphical representation of a coordinate system on which a coordinate transformation may be performed.
Figure 5:
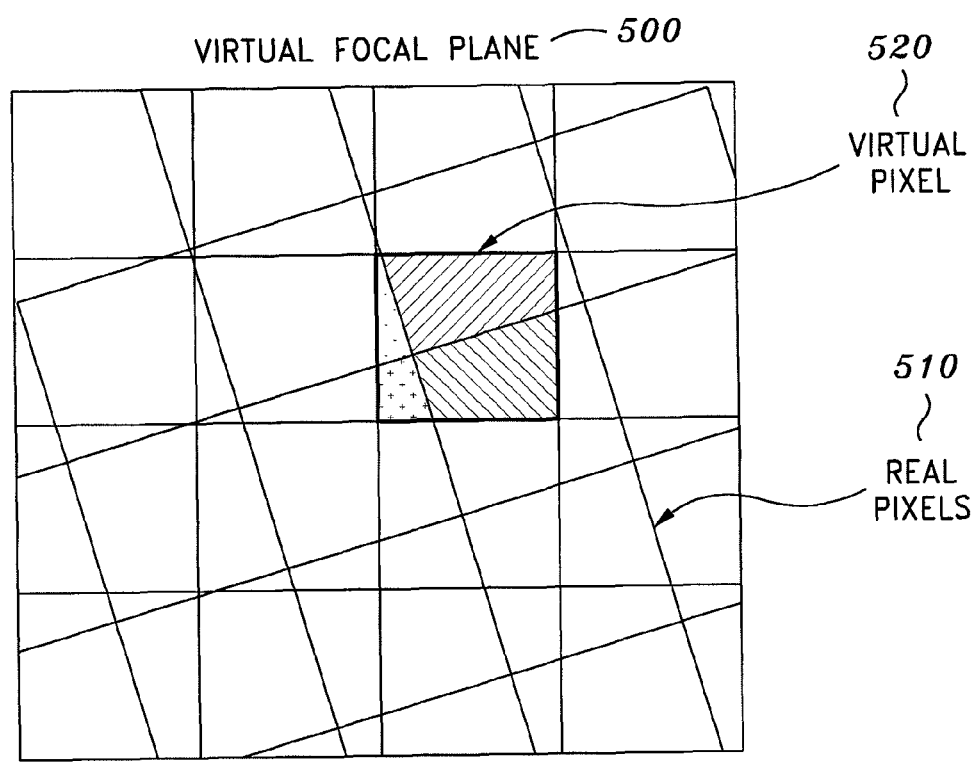
FIG. 5 illustrates a virtual focal plane and the mapping of real pixels to virtual pixels.
Figure 6A:
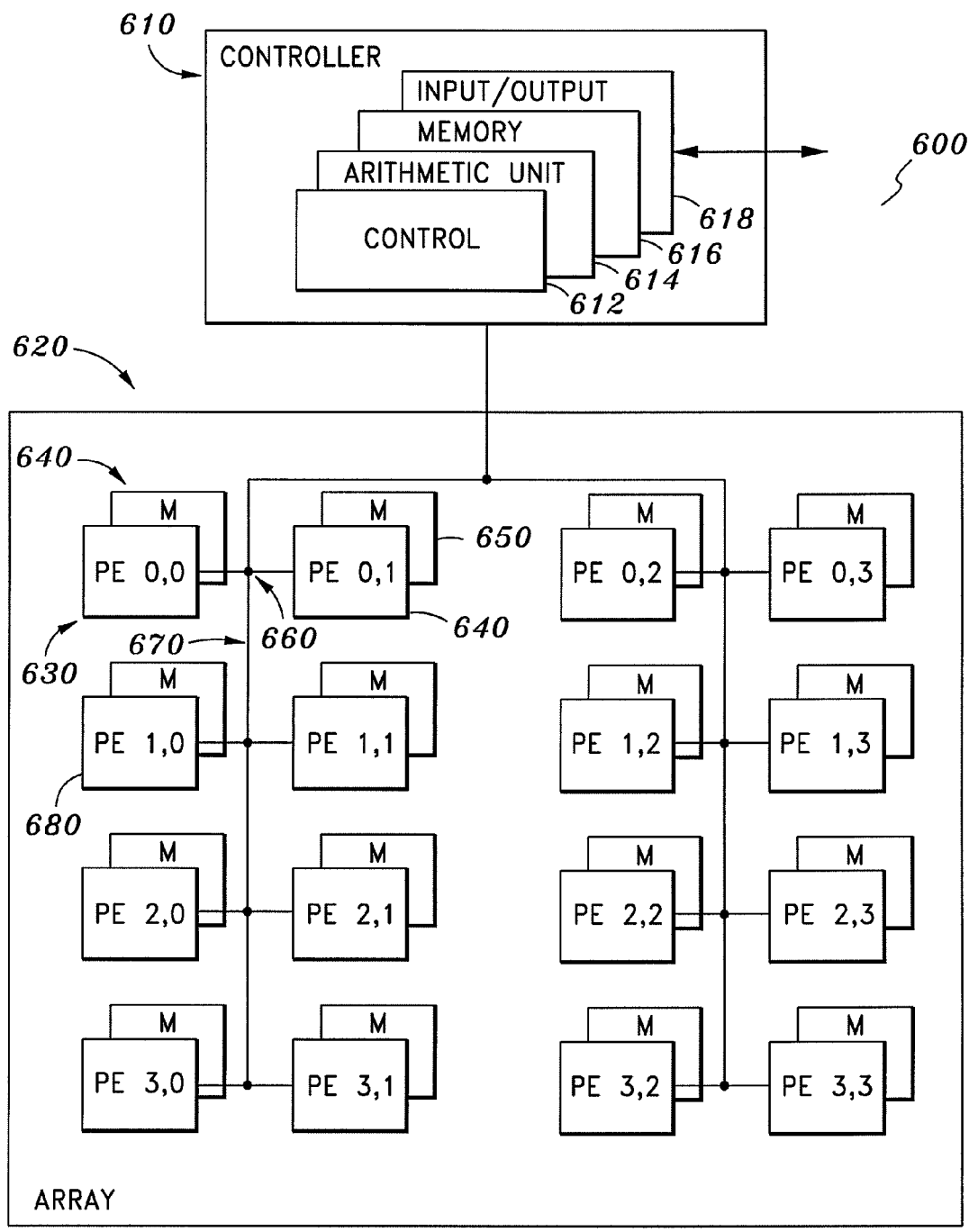
FIG. 6A illustrates a SIMD computer architecture used to stabilize focal plane data in accordance with one embodiment of the present disclosure.

Referring now to FIG. 6A, illustrated is a SIMD computer architecture 600 in accordance with one embodiment of the present disclosure. In this computer architecture 600, a general-purpose computer 610 supplies instructions to an array of simpler devices called Processing Elements (PE's) 620. The controller 610 may include a control unit 612, an arithmetic unit 614, a memory 616 and an I/O mechanism 618.

The PE's 620 do not have separate control units nor input/output (I/O) mechanisms. The PE's may be deliberately simplified so that large numbers of PE's can be placed on a semiconductor chip. Each PE and its memory module is addressable. The address may be represented by a row number and column number. For example, the address location for $PE_{0,0}$ 630 may be represented by row 0, column 0.

$PE_{0,0}$ 630 has a data path 660 to $PE_{0,1}$. $PE_{0,0}$ 630 could also take a southern data path 670 to $PE_{1,0}$ or to any other PE in PE array 620. Each PE also has memory M as shown throughout PE array 620. By way of example, $PE_{0,0}$ 630 has its own memory module 640 associated with $PE_{0,0}$ 630. However, each PE in PE array 620 receives instructions from the controller 610 and data from the memory 616 supplied with separate I/O connections 618.

This SIMD computer architecture 600 may incorporate additional logic to locally connect PE's. The PE array 620 is represented as a two-dimensional array of PE's. Each PE in PE array 620 has arithmetic capability and its own local memory storage as represented by M.

Each PE in PE array 620 has a unique row and column address and a nearest neighbor along either the row or column dimensions. PE's have a general means of exchanging information with other PE's or other PE's pixel memories through a routing network which uses the row/column address of the destination to steer data.

Figure 6B:
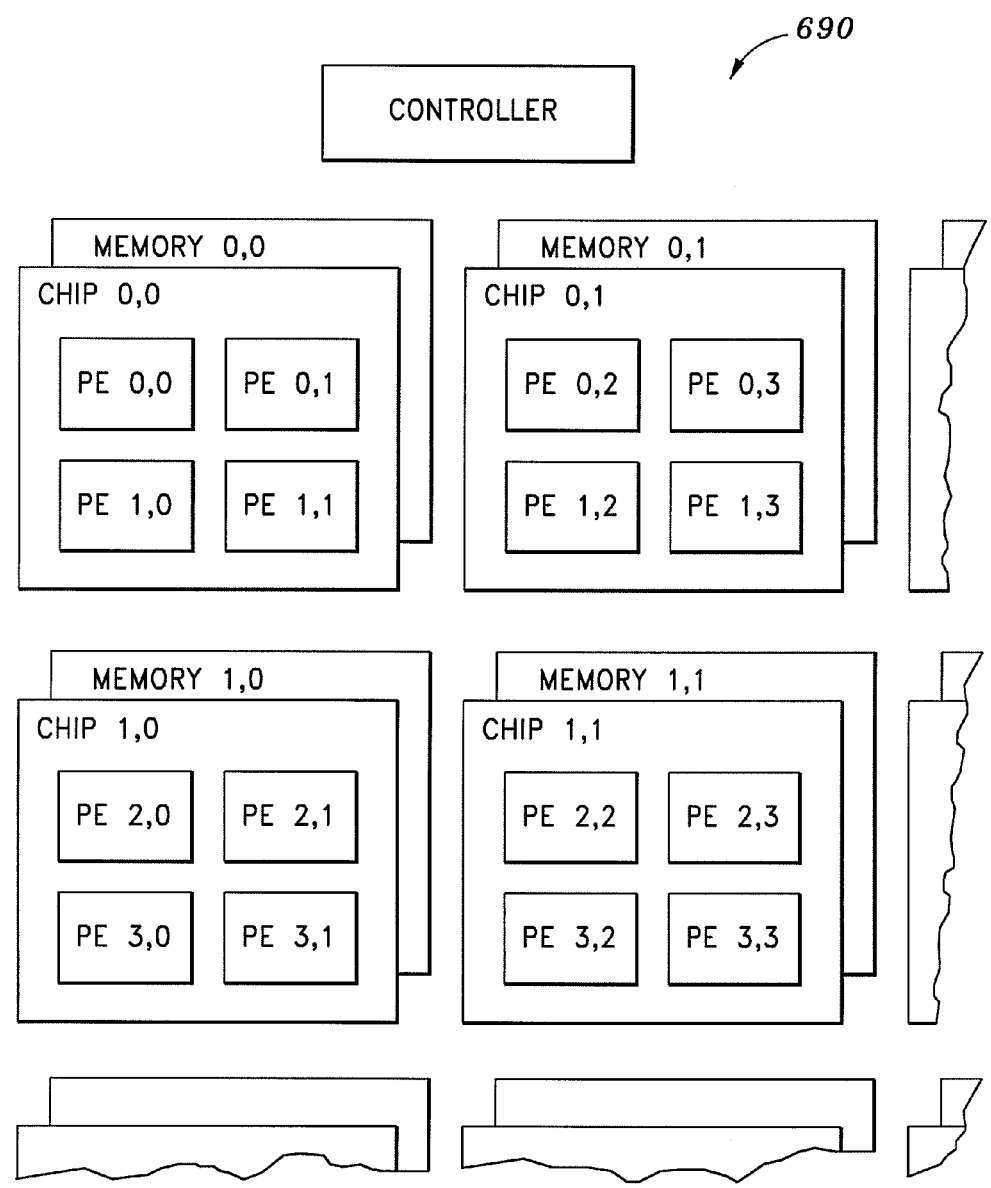
FIG. 6B illustrates partitioning of the PE array of FIG. 6A in accordance with one embodiment of the present disclosure.

A number of PE's may be located on a single chip. Referring now to FIG. 6B, illustrated is a schematic diagram 690 showing partitioning of the PE's among chips. As shown, memory may be associated with a particular PE or series of PE's. For example, memory addressed at row 0, column 0 may be associated with $PE_{0,0}$, $PE_{0,1}$, $PE_{1,0}$ and $PE_{1,0}$.

Figure 7:
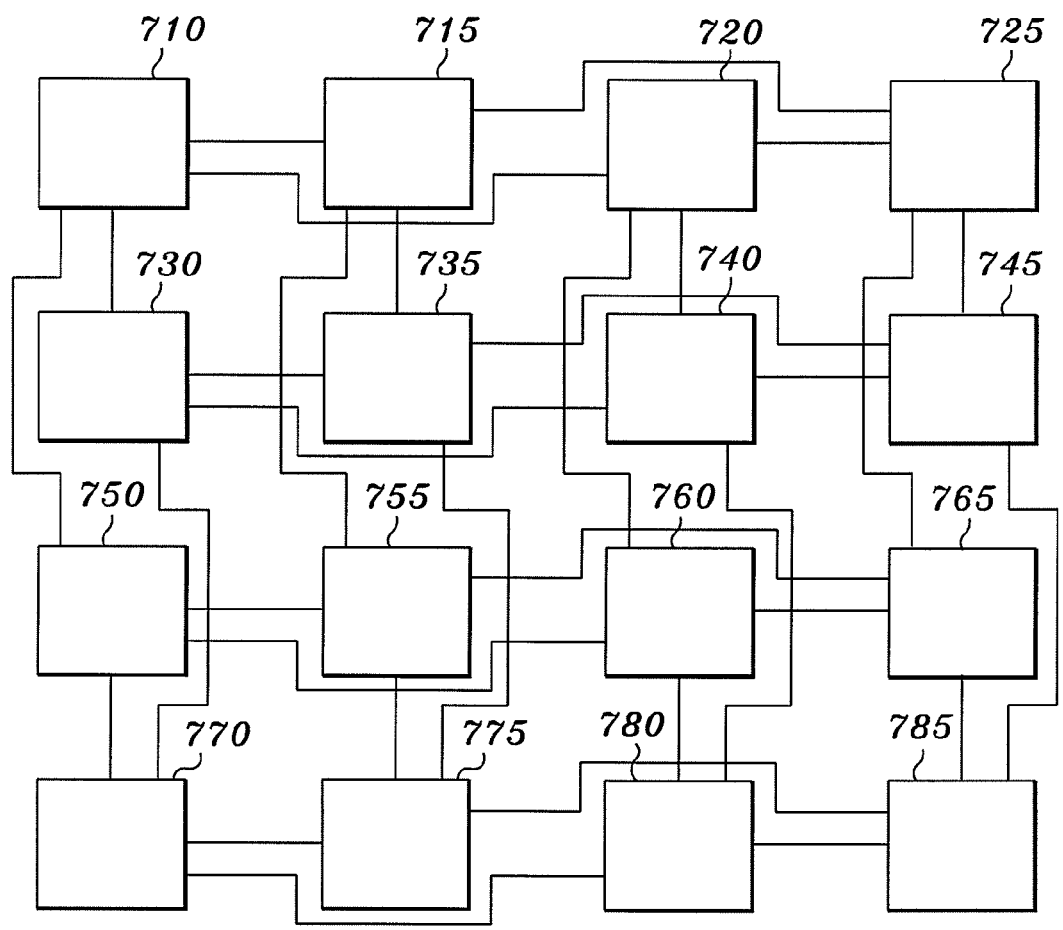
FIG. 7 illustrates a schematic diagram of data routing between chips in accordance with one embodiment of the present disclosure.

Referring now to FIG. 7, illustrated is a schematic diagram of data routing between chips. As illustrated, the pixel PE's can also share information locally along these directions and so can combine local knowledge. The former mechanism provides a way to process the entire field of view to detect targets while retaining maximum sensitivity. The latter mechanism provides a means to reprocess targets detected by the first mechanism and measure their properties to a high degree of detail.

Figure 8A:
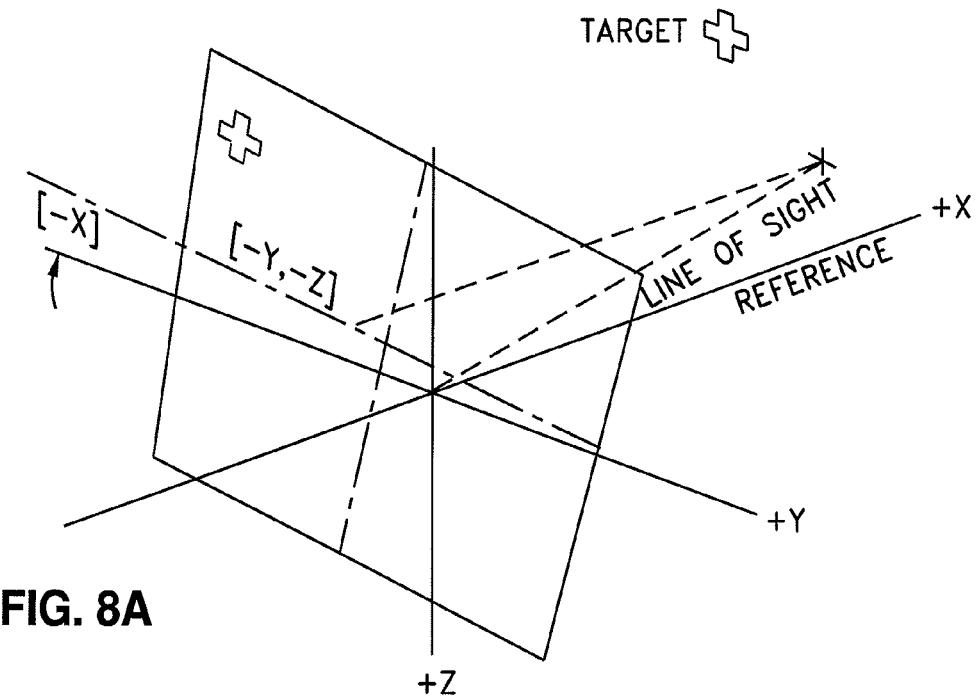
FIG. 8A illustrates line-of-sight coordinates that may be used to process the entire field-of-view, in accordance with one embodiment of the present disclosure.

Processing the entire field-of-view includes using the line-of-sight (LOS) coordinates to calculate the row and column address of the pixels that overlay the virtual field-of-view at the time that that pixel data was captured. Referring now to FIG. 8A, illustrated are line-of-sight coordinates that may be used to process the entire field-of-view.

Processing the entire field-of-view may be performed in two steps, and in such a way as to not break down the pixel data to a sub-pixel value, thereby losing signal integrity.

Figure 8B:
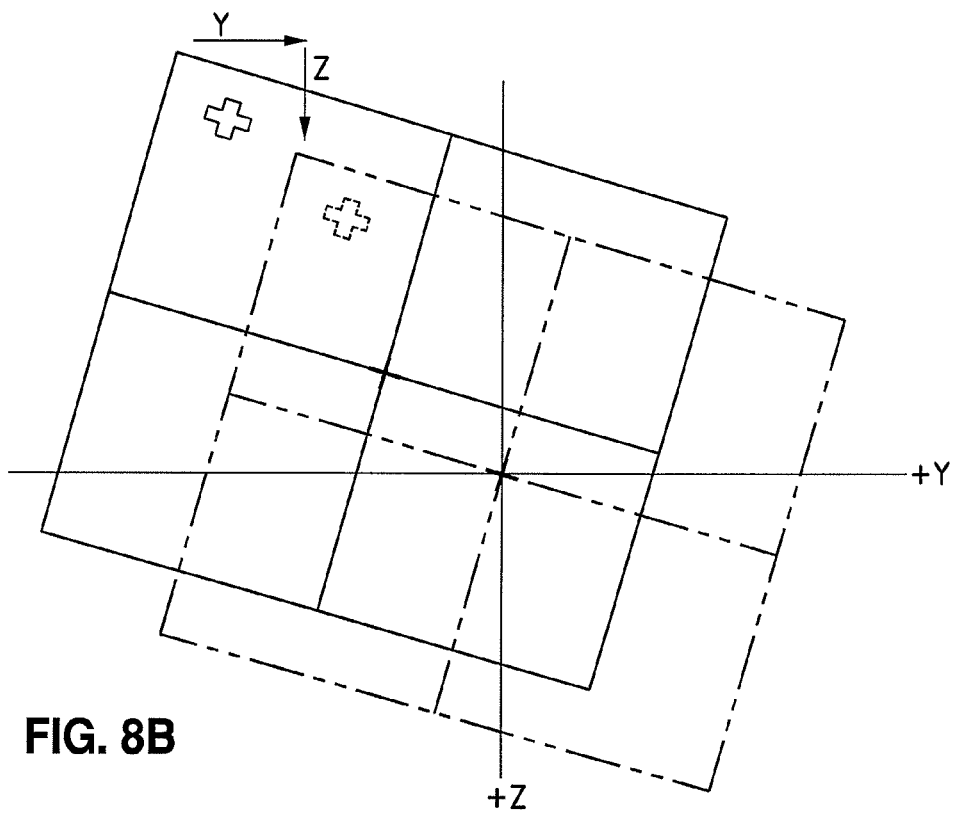
FIG. 8B illustrates how entire FOV may be translated to the boresight (or center position) of the virtual field-of-view according to the camera pitch and yaw offsets, in accordance with one embodiment of the present disclosure.

In the first step, the entire FOV is translated to the boresight of the virtual field-of-view according to the camera pitch and yaw offsets available from an inertial measurement unit (IMU). Referring now to FIG. 8B, illustrated is an example of how entire FOV may be translated to the boresight of the virtual field-of-view according to the camera pitch and yaw offsets. This translation may be limited to the nearest pixel so as to avoid interpolation from multiple pixels.

In the second step, the FOV is rotated to approximate an exact rotation about boresight. This approximate rotation advantageously utilizes the PE-memory routing network, and again avoids combining information from multiple pixels.

Some aspects of this process are advantageous to effective detection of low intensity signals. In the infra red (IR) region especially, the internal warmth of the camera body and optics may induce a uniform background offset to the video data. The motion of the focal plane, coupled as it is to missile body motion, provides a random dithering. Dithering is a well known electronic technique used in many different areas to remove directly coupled (DC) offsets. By subtracting previously collected frames from the current frame, only the difference information is summed, effectively removing the background. Continued summing of the differences corrected for LOS motion causes a signal to rise above the other noise sources. Over time, a stable image is built up in the VFOV and this can be processed to detect and track targets.

In this architecture, portions of memory are dedicated to represent two-dimensional arrays identical in size to the camera focal plane. Typical focal planes in use range from 128×128 pixels to 512×512 pixels. They are not necessarily square powers of two, although this is convenient for memory allocation.

One of these distributed memory arrays may be the VFOV. Each sampled input video frame is processed by the PE's to remove any systematic offsets. Each PE reads the pixel value and then calculates a new address for a virtual pixel in the VFOV. The address calculation first translates the row and column address by the LOS pitch and yaw difference to the boresight, and then rotates the data by the roll angle.

Figure 8C:
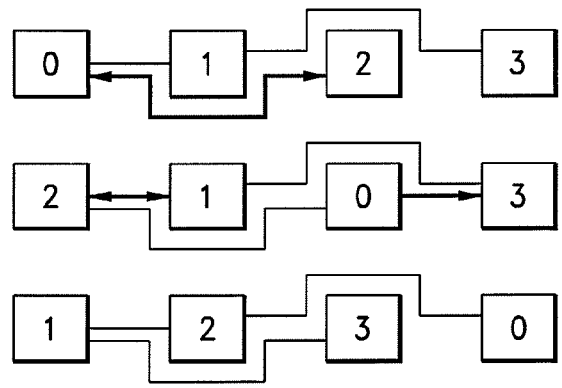
FIG. 8C illustrates coordinate translation of incoming data in row dimension via the routing network, in accordance with one embodiment of the present disclosure.
Figure 8C:
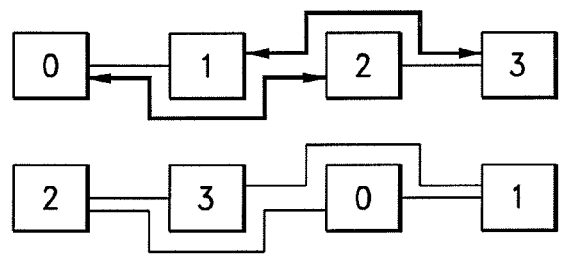
Figure 8C:
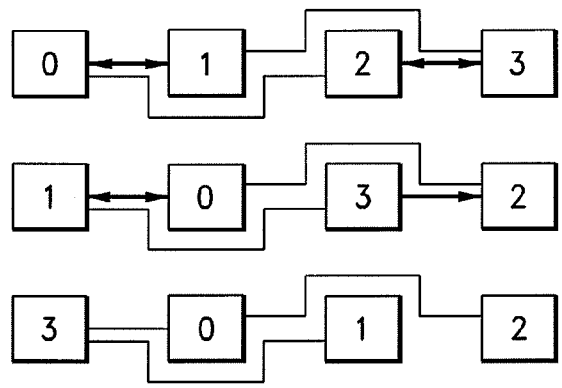

Translation of the data is straightforward, as each pixel moves to a new location in the VFOV as though it were physically slid into place. The PE-Memory routing network interprets the new row and column address of each pixel as steering information to guide the data to a specific memory segment distributed uniformly across the PE array. Referring now to FIG. 8C, illustrated is coordinate translation of incoming data in row dimension via the routing network.

Figure 8D:
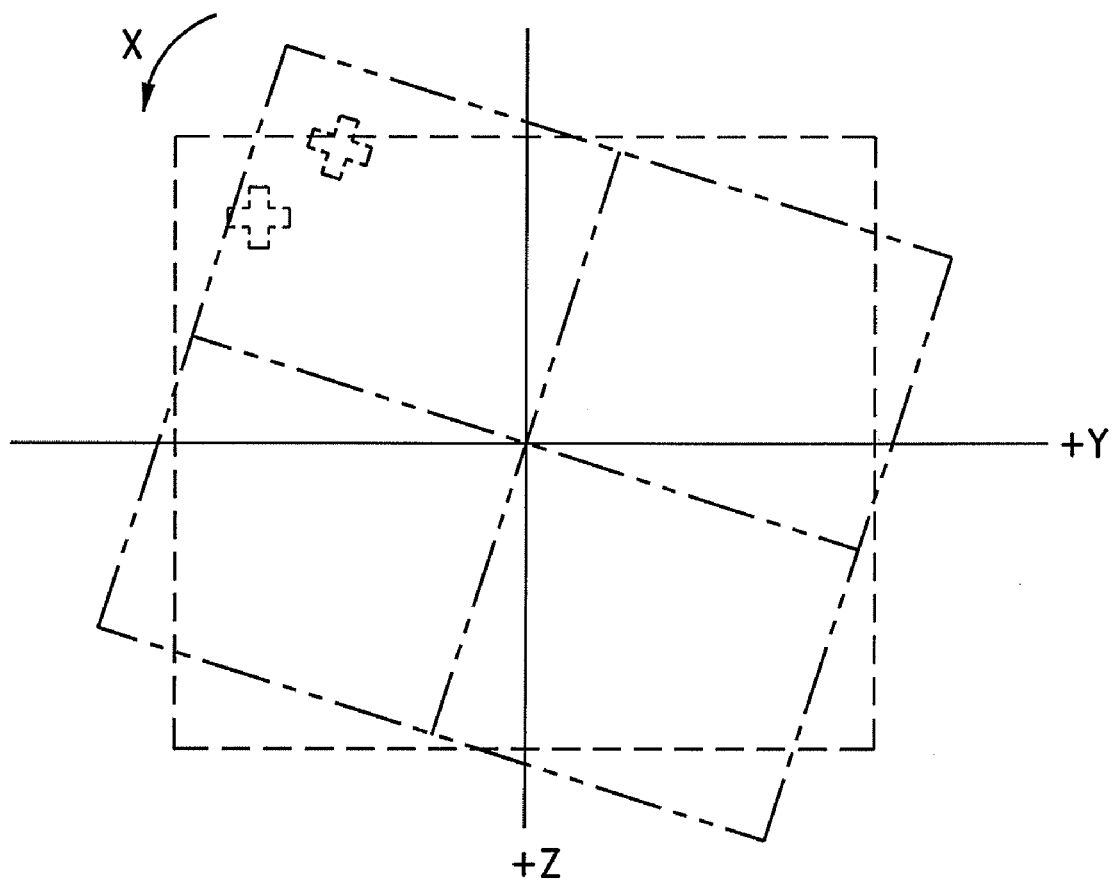
FIG. 8D illustrates coordinate rotation of incoming data in accordance with one embodiment of the present disclosure.

Rotation of the data is performed in a novel way in accordance with the present disclosure. Referring now to FIG. 8D, illustrated is an example of coordinate rotation of incoming data. This rotation may be effected by approximating a real rotation using two successive shear transforms in two dimensions to move the unchanged sampled video to its rolled position. This again uses the PE-Memory routing network.

Figure 9:
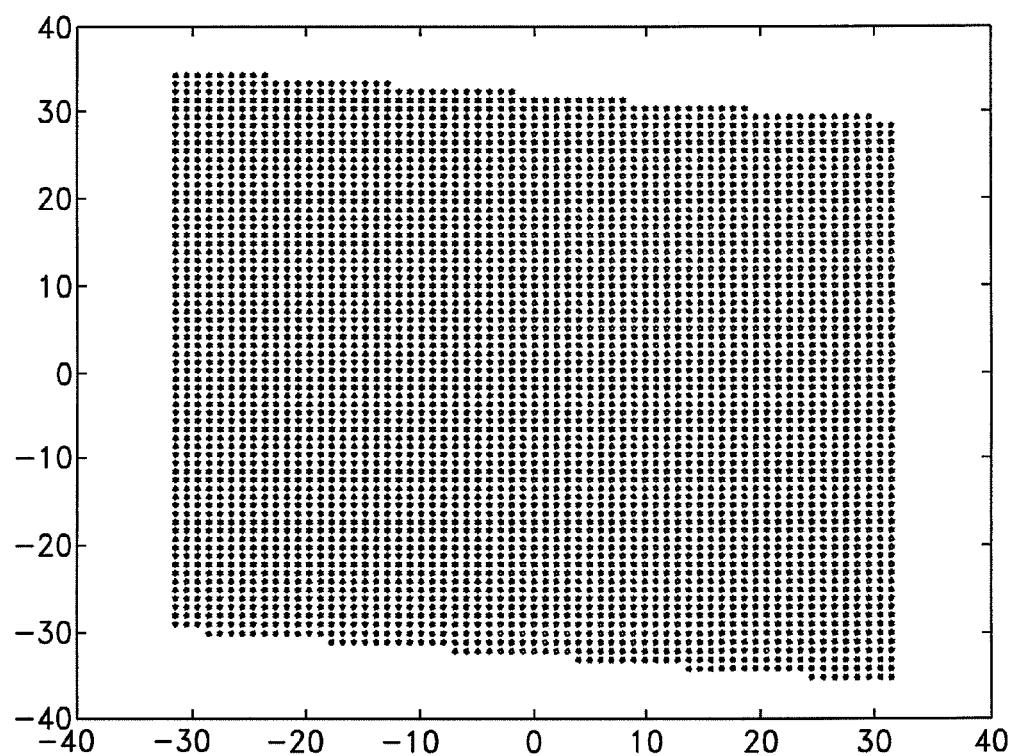
FIG. 9 illustrates how vertical shear may be the equivalent to translation among columns in accordance with one embodiment of the present disclosure.

The shear transformations may be performed in two successive steps. First, only the row addresses of the real pixels are modified to move them to a new position that is a function of both the roll angle and the column number. In this manner, a vertically sheared array may be created. Referring now to FIG. 9, illustrated is an example of how vertical shear may be the equivalent to translation among columns.

Figure 10:
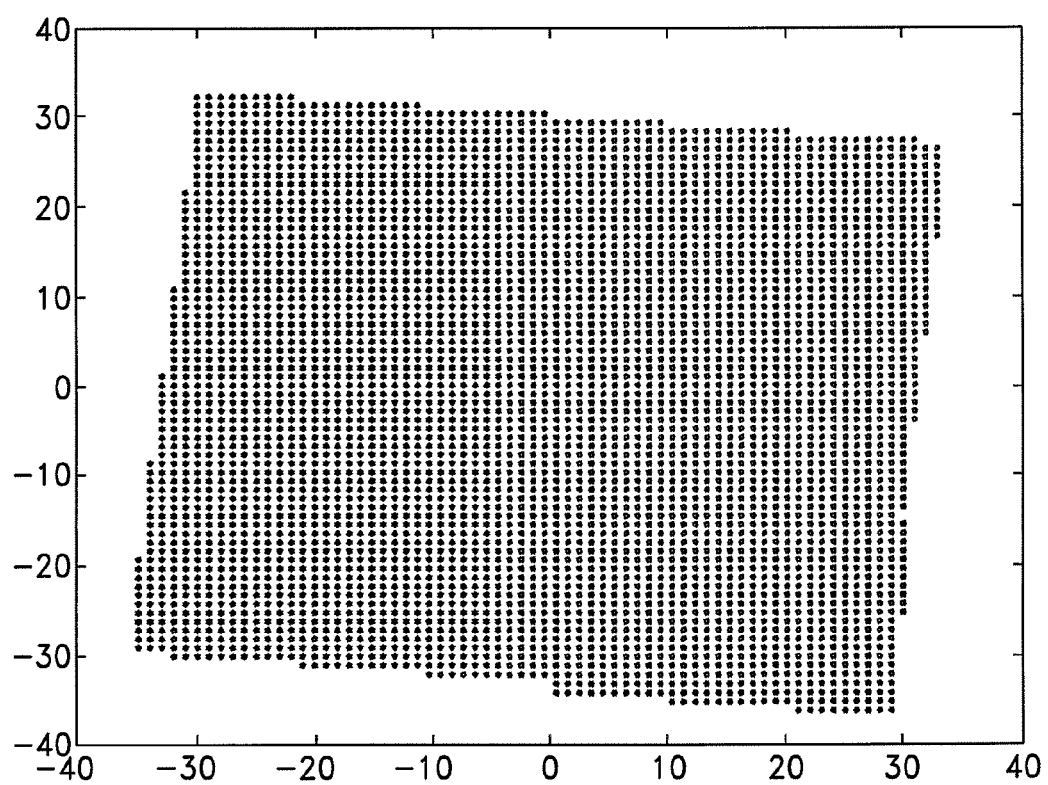
FIG. 10 illustrates how horizontal shear may be equivalent to translation among the rows in accordance with one embodiment of the present disclosure.

Second, only the column addresses of the vertically sheared pixels are modified. Referring now to FIG. 10, illustrated is an example of how horizontal shear may be equivalent to translation among the rows. This moves the vertically sheared pixels to a new position that is a function of both the roll angle and the row number.

The unique data handling capability embodied in the dedicated PE-memory router makes these translation and rotation operations an efficient means of moving data to the correct memory locations to achieve the effect of electronic stabilization. These operations are performed a manner which avoids arithmetic operations on the pixel amplitude value. Operations of this sort may introduce detector to detector non-uniformity noise, and may reduce the signal-to-noise ratio, thus resulting in an undesired effect.

Objects that lie along shear lines may have their geometries distorted. Accordingly, the system and method described herein is suitable for precise repositioning of pixel data in a small local coordinate system positioned near the object. The system and method described herein also provides for precise joining of the originally acquired video data using the PE nearest-neighbor communication links.

The system architecture preserves original data from both video and LOS processing. Once a target has been detected, the pixels in the area of the target can be reprocessed to most effectively estimate critical measurement parameters such as position, shape, and amplitude.

Figure 11:
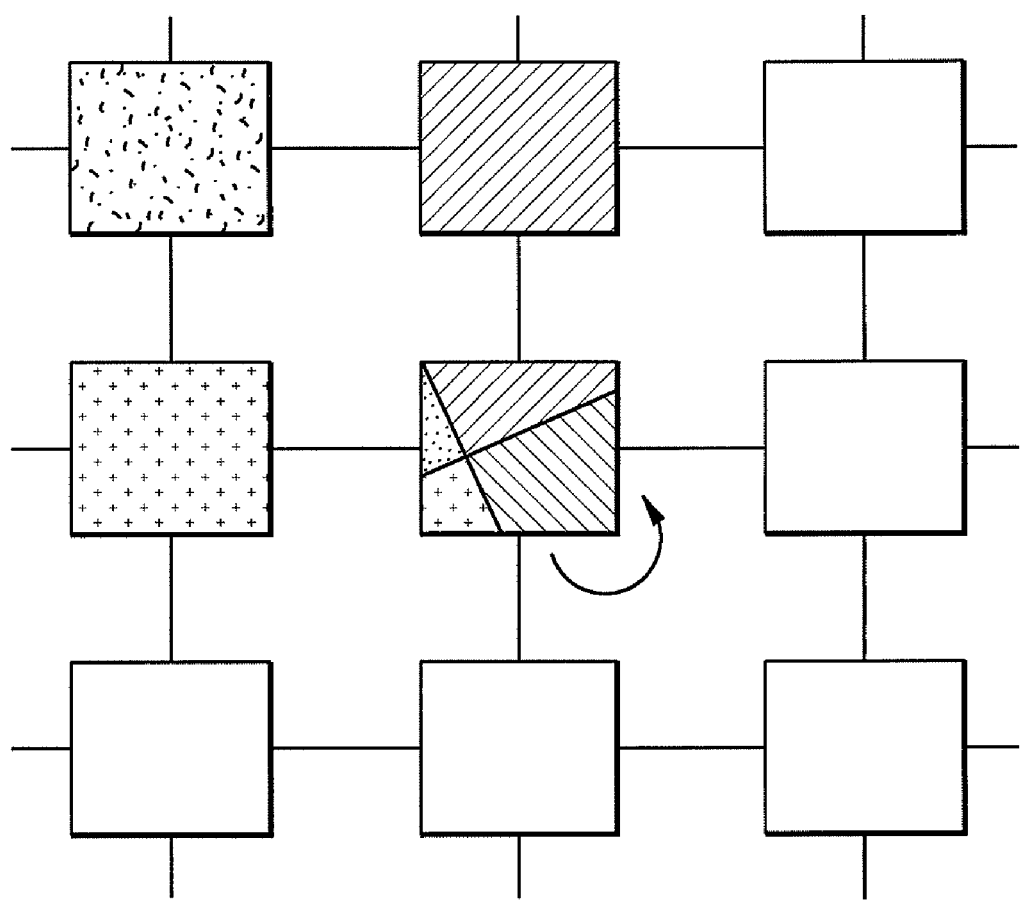
FIG. 11 illustrates nearest neighbor reprocessing of video data in accordance with one embodiment of the present disclosure.

Referring now to FIG. 11, illustrated is an example of nearest-neighbor reprocessing of video data. Two related and previously filed or awarded patents are involved in the support of this summary description. Methods are available for mixing very complex algorithms that are not particularly suited to SIMD processing with those that are. These methods may be used in reprocessing video data. Moreover, U.S. Pat. No. 5,838,813, assigned to the assignee of the present disclosure, provides for Dithered Image Reconstruction which is suitable for implementation on this processor.

The previous description of the disclosed embodiments is provided to enable one skilled in the art to make or use the present disclosure. Various modifications to these embodiments will be readily apparent to those skilled in the art. The principles set forth herein may be applied to other embodiments without departing from the spirit or scope of the disclosure. Thus, the present disclosure is not intended to be limited to the embodiments shown herein but is to be accorded the widest scope consistent with the principles and novel features disclosed herein.

We claim:

1. A method for maximizing the signal-to-noise ratio for detecting targets with non-uniform detector arrays, the method comprising:
   capturing a plurality of image frames;
   performing a two-dimensional vertical shear transformation, on each frame, by modifying row addresses of original pixels in order to reposition the original pixels based on a column number and roll angle for each pixel, thereby creating a vertical sheared array;
   performing a two-dimensional horizontal shear transformation on the vertically sheared array of each frame by modifying only the column addresses of the vertically sheared pixels to reposition the pixels based on the roll angle and the row number, thereby creating a horizontally sheared array;
   dithering the created horizontal sheared array; and
   summing difference information between successive image frames of the plurality of image frames to maximize the signal-to-noise ratio.

2. A method for maximizing the signal-to-noise ratio for detecting targets with non-uniform detector arrays, the method comprising:
   capturing first and second image frames;
   performing a two-dimensional horizontal shear transformation on each frame by modifying only the column addresses of the vertically sheared pixels to reposition the pixels based on the roll angle and the row number, thereby creating a horizontally sheared array; and
   performing a two-dimensional vertical shear transformation on the horizontally sheared array, including by modifying row addresses of original pixels in order to reposition the original pixels based on a column number and roll angle for each pixel, thereby creating a vertical sheared array;
   dithering the vertical sheared array of each frame to remove directly coupled offsets; and
   subtracting dithering information of the second frame from the first frame.

3. The method of claim 2, further comprising:
   capturing a third image frame;
   performing a two-dimensional horizontal shear transformation on the third frame to create a horizontally sheared array; and
   performing a two-dimensional vertical shear transformation on the horizontally sheared array to create a vertical sheared array;
   dithering the vertical sheared array of the third frame;
   subtracting dithering information of third frame from second frame; and
   summing differences information between first and second frames and second and third frames.

* * * * *